(12) United States Patent
Barrett, II

(10) Patent No.: US 7,473,359 B1
(45) Date of Patent: Jan. 6, 2009

(54) SYSTEM FOR STRAINING WATER

(76) Inventor: F. Madison Barrett, II, 2501 Mike Padgett Hwy., Augusta, GA (US) 30906

( * ) Notice: Subject to any disclaimer, the term of this patent is extended or adjusted under 35 U.S.C. 154(b) by 0 days.

(21) Appl. No.: 11/825,767

(22) Filed: Jul. 9, 2007

(51) Int. Cl.
- B01D 25/00 (2006.01)
- B01D 35/02 (2006.01)
- B08B 9/032 (2006.01)
- E03B 9/04 (2006.01)

(52) U.S. Cl. .................. 210/232; 210/497.3; 137/15.05; 134/168 C; 134/22.12

(58) Field of Classification Search ........................ None
See application file for complete search history.

(56) References Cited

U.S. PATENT DOCUMENTS

| | | | | |
|---|---|---|---|---|
| 134,077 A | * | 12/1872 | Large | 210/416.1 |
| 381,990 A | * | 5/1888 | Driller | 210/318 |
| 470,192 A | * | 3/1892 | Gross | 210/449 |
| 557,075 A | * | 3/1896 | Langer | 210/306 |
| 1,107,485 A | * | 8/1914 | Bowser | 210/304 |
| 1,115,016 A | * | 10/1914 | Pheils | 220/484 |
| 1,750,764 A | * | 3/1930 | Schaefer | 100/111 |
| 1,835,429 A | * | 12/1931 | Rice et al. | 210/445 |
| 1,961,498 A | * | 6/1934 | Krueger | 210/305 |
| 1,971,120 A | * | 8/1934 | Rice et al. | 210/445 |
| 2,019,094 A | * | 10/1935 | Rice et al. | 210/445 |
| 2,647,636 A | * | 8/1953 | Rafferty | 210/238 |
| 2,658,625 A | * | 11/1953 | Rafferty | 210/445 |
| 3,374,673 A | * | 3/1968 | Trageser | 73/204.21 |
| 3,429,108 A | * | 2/1969 | Larson | 55/432 |
| 3,450,207 A | * | 6/1969 | Hirsch | 166/233 |
| 3,458,050 A | | 7/1969 | Cooper | |
| 3,934,992 A | * | 1/1976 | Thompson | 55/324 |
| 4,018,686 A | * | 4/1977 | Shufflebarger et al. | 210/448 |
| 4,033,872 A | * | 7/1977 | Mori | 210/167.04 |
| 4,043,915 A | | 8/1977 | Man | |
| 4,052,315 A | * | 10/1977 | Lindsay et al. | 210/232 |
| 4,135,899 A | * | 1/1979 | Gauer | 55/482 |
| 4,222,755 A | * | 9/1980 | Grotto | 55/291 |
| 4,278,455 A | * | 7/1981 | Nardi | 55/337 |
| 4,314,832 A | * | 2/1982 | Fox | 55/482 |
| 4,393,891 A | * | 7/1983 | Snoek et al. | 137/238 |
| 4,500,332 A | * | 2/1985 | Gillingham | 55/443 |
| 4,758,256 A | * | 7/1988 | Machado | 55/498 |
| 4,839,038 A | * | 6/1989 | McLain, II | 210/137 |
| 4,849,105 A | * | 7/1989 | Borchert | 210/408 |
| 4,946,598 A | | 8/1990 | Murphy et al. | |
| 5,132,013 A | | 7/1992 | Thompson | |
| 5,184,571 A | * | 2/1993 | Hostetler et al. | 119/72 |
| 5,201,338 A | * | 4/1993 | McKeague | 137/238 |
| 5,863,443 A | | 1/1999 | Mainwaring | |
| 5,885,364 A | * | 3/1999 | Hieatt et al. | 134/22.11 |
| 5,888,260 A | * | 3/1999 | Sica | 55/331 |
| 5,897,787 A | | 4/1999 | Keller | |
| 5,915,395 A | * | 6/1999 | Smith | 134/22.12 |

(Continued)

Primary Examiner—Robert James Popovics
(74) Attorney, Agent, or Firm—McNair Law Firm, P.A.

(57) ABSTRACT

A water straining system for use in a flushing arrangement for a water delivery system. The flushing arrangement is connected to a main line of the water delivery system and includes a discharge valve controlled by an automatic valve control unit. A filter is positioned in the pipeline of the flushing arrangement between the main line and the automatic valve control. The filter acts to prevent debris in the main line from entering the discharge valve where it could become stuck preventing closure of the discharge valve.

11 Claims, 5 Drawing Sheets

U.S. PATENT DOCUMENTS

| | | |
|---|---|---|
| 5,916,435 A | 6/1999 | Spearman et al. |
| 5,921,270 A * | 7/1999 | McCarty .................... 137/240 |
| 6,035,704 A | 3/2000 | Newman |
| 6,056,211 A * | 5/2000 | DiLoreto ................... 239/288 |
| 6,227,463 B1 * | 5/2001 | Porter ........................ 239/310 |
| 6,318,564 B1 | 11/2001 | Archibald et al. |
| 6,467,498 B1 * | 10/2002 | Esmailzadeh ............... 137/238 |
| 6,627,089 B1 * | 9/2003 | Wilkinson ................. 210/754 |
| 6,766,825 B2 * | 7/2004 | Antunez .................... 137/549 |
| 6,820,635 B1 * | 11/2004 | McKeague ................. 137/299 |
| 6,836,963 B2 * | 1/2005 | Wnuk et al. ............. 29/896.61 |
| 6,854,664 B2 | 2/2005 | Smith |
| 6,939,465 B2 | 9/2005 | Dupre |
| 6,948,512 B2 * | 9/2005 | McKeague ............... 137/15.05 |
| 6,955,266 B2 * | 10/2005 | Ballet et al. ................. 210/409 |
| 7,044,149 B2 * | 5/2006 | Hallam et al. ........... 137/15.09 |
| 7,063,783 B2 | 6/2006 | Ballet et al. |
| 7,276,159 B2 * | 10/2007 | Taylor et al. ................ 210/205 |
| 2002/0074273 A1 * | 6/2002 | Golovatai-Schmidt et al. ... 210/130 |
| 2003/0178349 A1 * | 9/2003 | Bacon et al. .................. 210/94 |
| 2003/0192835 A1 * | 10/2003 | Wilkinson .................. 210/805 |
| 2004/0031747 A1 * | 2/2004 | Dupre ........................ 210/411 |

* cited by examiner

SYSTEM FOR STRAINING WATER

BACKGROUND OF THE INVENTION

The present invention is directed to strainers or filters for use with drinking water systems which are periodically flushed to remove sediment and chemical buildup which accrues over time, particularly in areas of low usage. More specifically, the filters are intended for use with water systems which utilize an automatic control to activate and de-activate the valves used to flush the system in the selected areas.

It has been found that, along with sediment and chemical buildup, water system pipes sometimes accumulate debris or trash which is of a size that can become engaged in the flush valve. When this occurs, the valve cannot close properly when activated by the automatic control. The result is large quantities of water are lost and line repairs are necessary to repair the valve for proper closure.

The strainers or filters of the invention are connected with water pipes of the water system adjacent to and upstream of the flush valve and the automatic valve control. The strainers are positioned to intercept and retain any large debris which may be present, and, thereby, keep the valve free to be opened and closed by the automatic control system.

It is, therefore, the primary object of the instant invention to retain debris in a water system separated from the flush valves of a drinking water system.

SUMMARY OF THE INVENTION

The invention is directed to a system for straining or filtering water prior to its passing through a valve and automatic valve control of a flushing arrangement of a water system. The water system generally includes water delivery pipes, with hollow interiors, which are connected with a main line at a location forward of the flushing valve. The conically shaped strainer includes a body with a first end and a larger second end. The first end of the strainer is covered with a cap which is secured with the body while the second end includes an outwardly directed flange secured and engaged with the outer edge of the body. The conical strainer is positioned between adjacent pipes and within the hollow interior of one of the pipes with its flange engaged between adjacent pipe ends which fixedly positions the strainer within the hollow interior of the pipe When the valve is opened by the automatic control, to flush the main line or pipe, debris present in the water as it moves through the strainer toward the valve and the exit end is caught and retained by the strainer. Thus, the debris is prevented from reaching and disabling the operation of the valve.

The first end of the strainer comprises a perforated cap with a downwardly directed flange. The cap is positioned over the first end of the body with the flange engaged over an outer edge of the body portion.

The pipe connectors may include interconnected flanged ends formed integral with the pipes. The strainer flange is engaged between adjacent pipe flanges upstream of the valve control. There may be a washer positioned between the pipe flanges and the strainer flange. Alternatively, the connectors may comprise threaded coupling sleeves engaged with adjacent threaded ends of the delivery pipes. Again the flange is engaged between and with adjacent ends of the delivery pipes by the coupling sleeve.

The second or larger end of the strainer includes a cross piece which extends across the open end and connects in opposed positions with the flange. The arrangement includes an elongate member which interconnects with the cross piece and the cap to further secure the cap with the first end and the strainer. The elongate member may comprise a bolt and nut which allows for easy assembly and removal. The arrangement provides for adjustable pressure between the cross piece and the cap.

The body of the strainer is made of perforated stainless steel. The flange and the cap are secured with the body of welding. The strainer, preferably, has 33% open space and is 24 gauge stainless steel.

The invention includes the method of preventing debris from reaching and blocking open a control value of an automatic flushing system in a water delivery system which includes the steps of:

providing a water discharge line and connecting the water discharge line with a main water line;

providing a valve and an automatic valve control and connecting the valve and automatic valve control with the water discharge line;

providing a strainer and positioning the strainer in fixed position in the water discharge line between the valve and the main line; so that, when the automatic control acts to open the valve, water flows from the main line through the water discharge line through the strainer, through the valve and out a discharge end effectively flushing the system of chemicals and sediment while debris is retained by the strainer and prevented from reaching and blocking the valve in its open position, thus allowing the automatic control to close the valve in a timely fashion.

DESCRIPTION OF A PREFERRED EMBODIMENT

Figure 1:
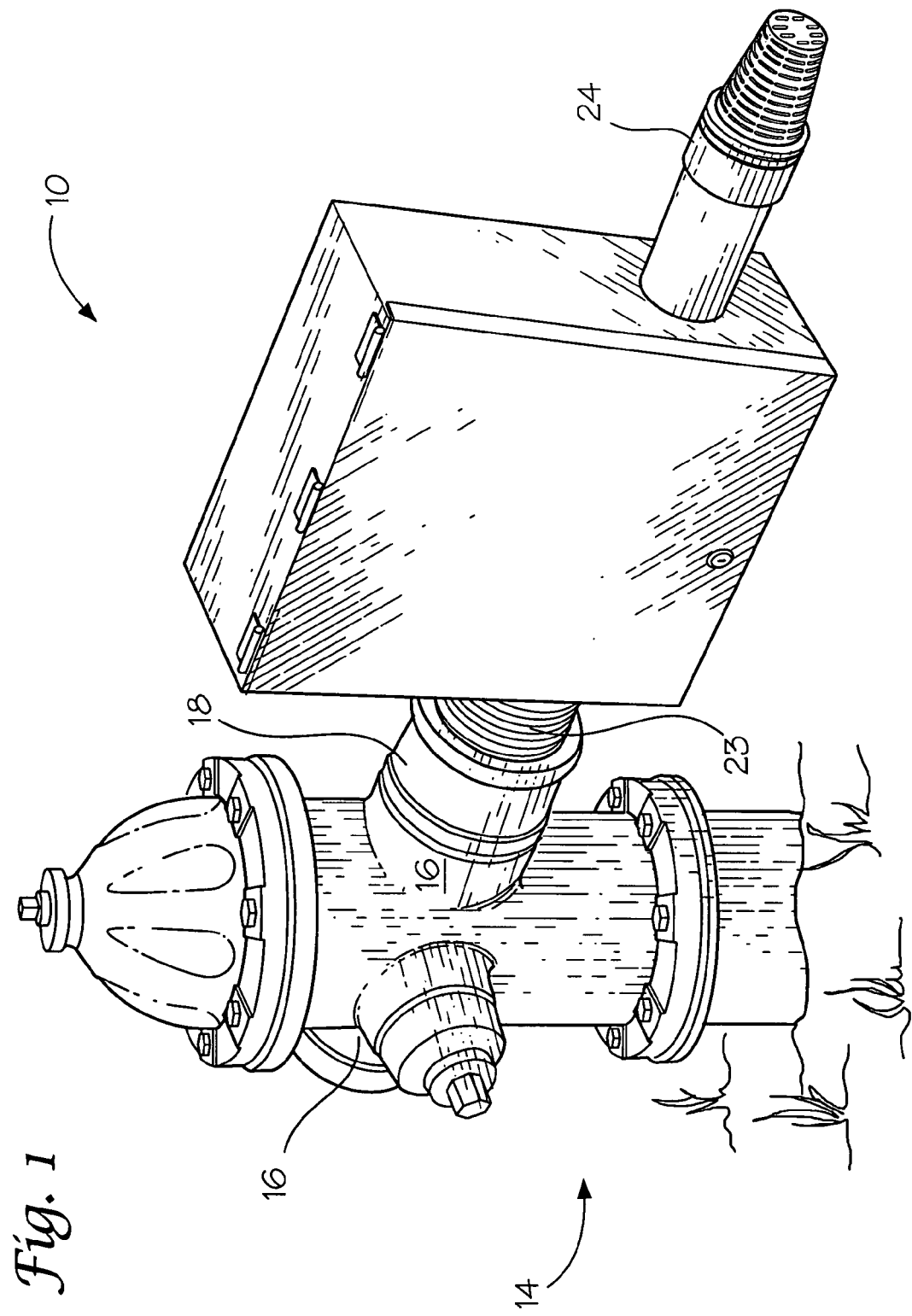
FIG. 1 is a perspective view of a known arrangement for flushing a water system in which the invention is incorporated.
Figure 2A:
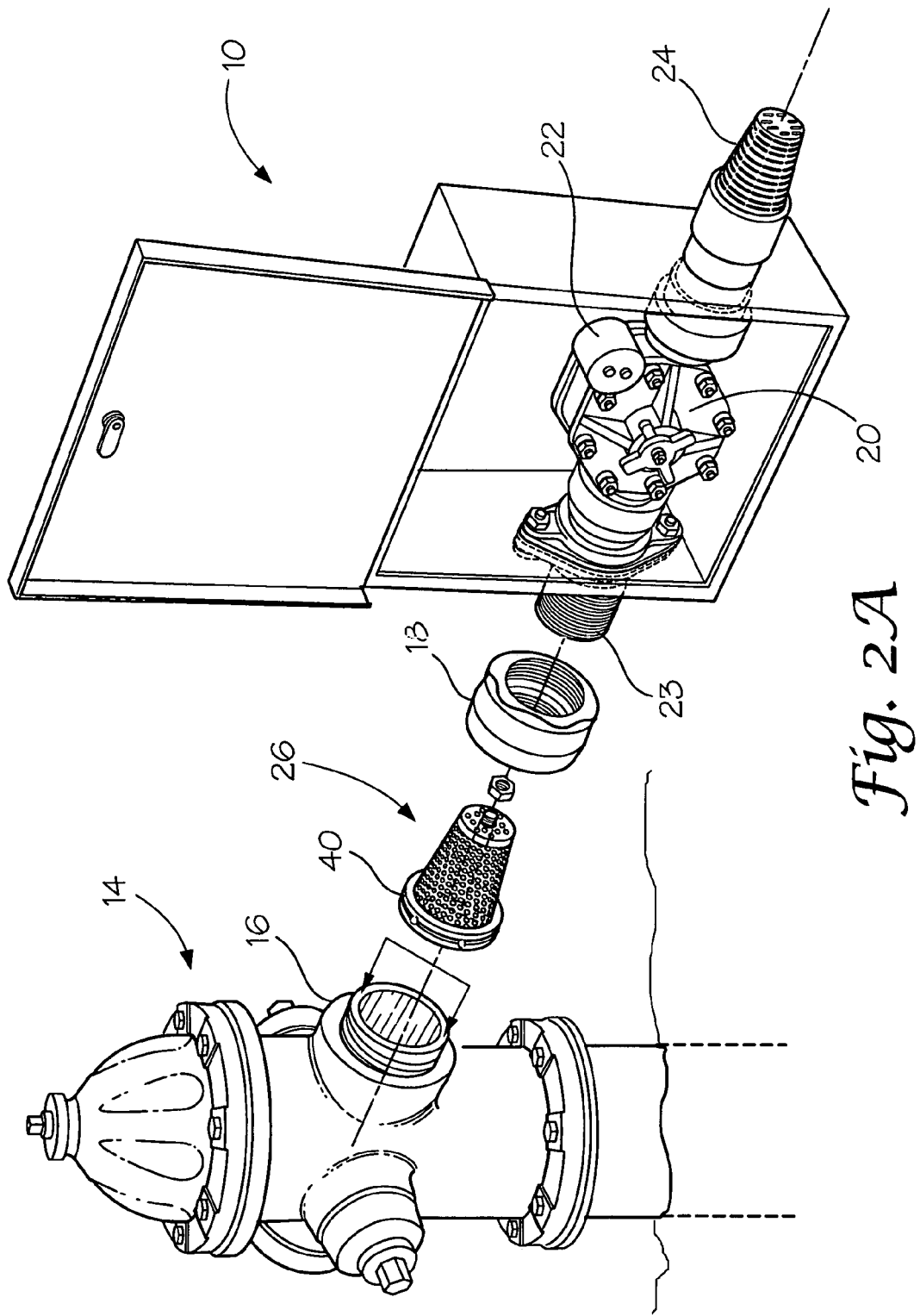
FIG. 2A is an exploded perspective view of the system of FIG. 1 showing the filter/strainer of the invention.
Figure 2B:
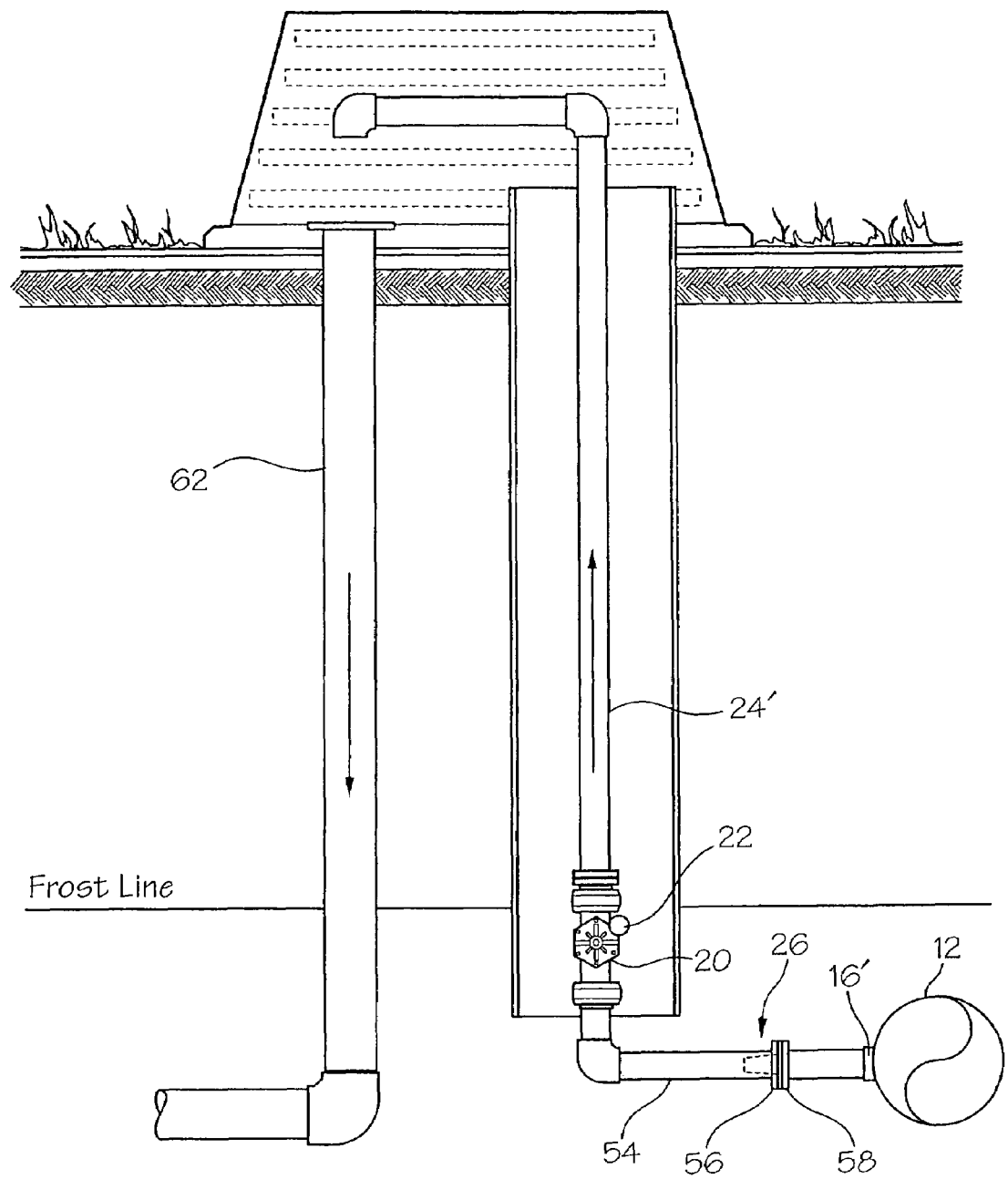
FIG. 2B is a cutaway side view of another known system for flushing a water system in which the filter/strainer of the invention may be used.

Turning now to the drawings, FIGS. 1 and 2B show discharge units for use with typical water supply systems.

As is shown in FIG. 1, a typical discharge system is shown connected to a fire hydrant.

In FIG. 2B, a known discharge system designed for use in cold climates is shown.

Typically, the usual water system includes a plurality of distribution or main lines, one of which is shown at 12 in FIG. 2B, which pass through desired areas and are connected by distribution lines to various outlets including residential, commercial, fire hydrants and discharge units. These water systems, over time, begin to accumulate sediment, a chemical buildup, and, in some instances, debris. In order to maintain the water within the system uniformly within pre-set purity standards, it is necessary to flush the system at various intervals, generally one to four times per year.

Flushing is done usually adjacent line ends or in dead areas where the water is mostly still because unwanted buildup is most likely to occur in these areas.

In large systems, automatic valve controls are used to open the selected valves connected with discharge units. After a desired period of time, the automatic control activates to close the selected valves.

When solid debris finds its way into the distribution line adjacent the discharge unit, it can sometimes become lodged in the discharge valve and prevent it from being closed by the automatic control. When this occurs, water is wasted and repair to the valve is required.

The invention comprises a filter or straining element for use in combination with the discharge unit of a water system which will trap debris and prevent the valve from becoming stuck in an open position.

A typical discharge unit 10 as shown in FIG. 1, shows fire hydrant 14 which is connected with the main line in usual manner and includes a plurality of outlets 16.

Discharge unit 10 is connected through pipe 23 to outlet 16 of hydrant 14 by coupling or sleeve 18. The discharge unit, as best shown in FIG. 2A, includes outlet valve 20 controlled by a programmed pod 22 which acts to open and close the valve at selected intervals. Out members, including pipes, couplings and a filter are shown at 24 through which the water is discharged into some type of drainage system.

Figure 3A:
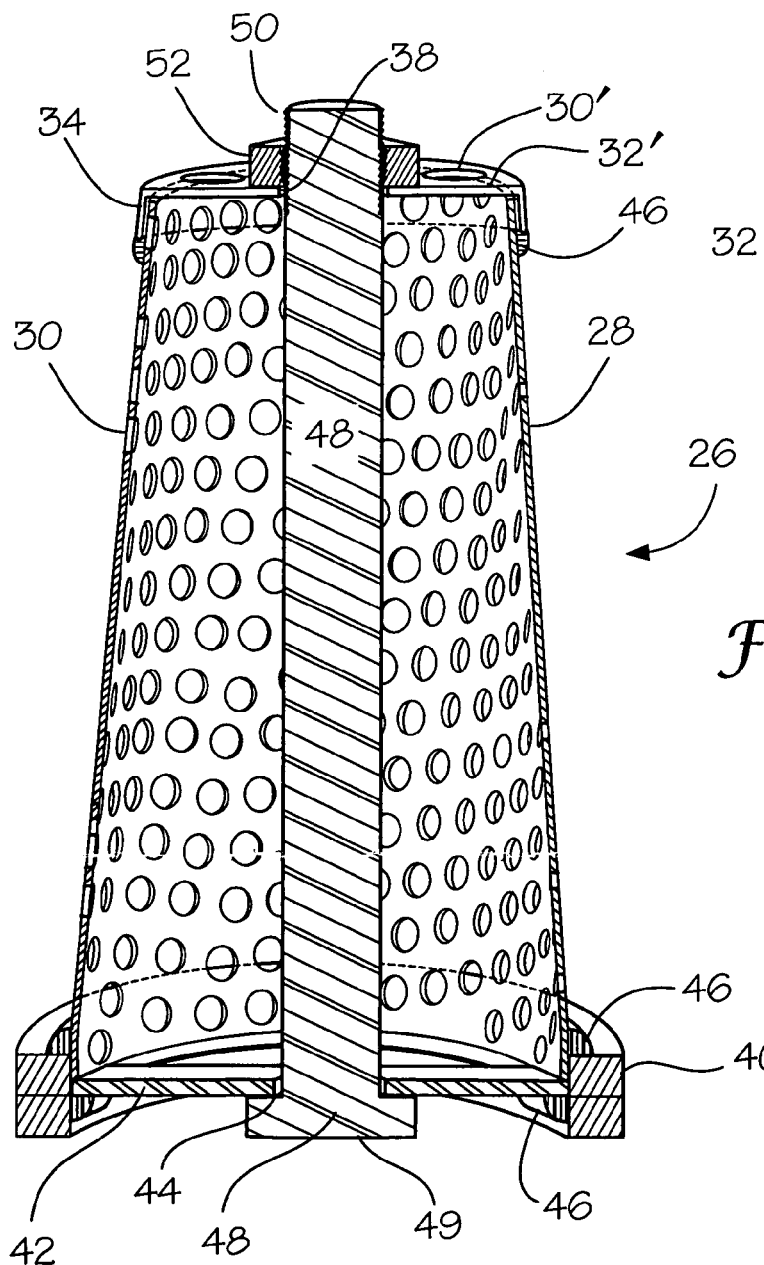
FIG. 3A is a cutaway side view of the filter/strainer of the invention.

A filter or strainer 26, FIGS. 2A and 3A, is inserted into the distribution lines 16 and 23 connecting discharge unit 10 between hydrant 14 and discharge valve 20.

Figure 3B:
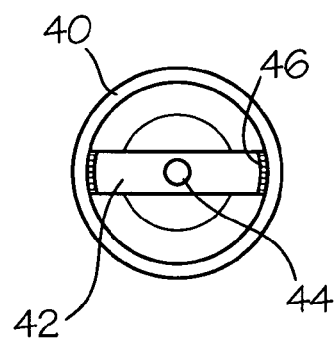
FIG. 3B is an end view of the filter/strainer of the invention.

Filter or strainer 26, as best shown in FIGS. 3A and 3B, consists of a conically shaped unit having a perforated body 28 preferably formed of 24 gauge stainless steel. The body, at a first end is about 1⅝" in diameter and at a second end is about 1⅞" in diameter. There are 3/32" holes 30 cut into the body in a uniform pattern providing open space of between 30% and 36% with 33% being preferred.

A cap 32, preferably also formed of 24 gauge stainless steel, includes a ⅛" down-turned collar 34 which is fitted over the first end. Cap 32 has a central bore 38 surrounded by equally spaced holes 30' of about 3/16" in diameter. The second end is formed with an outwardly directed flange or collar 40 having a diameter of about 2½".

Collar 40 includes a cross piece 42 which extends across the opening of the second end. An opening 44 is formed centrally of the cross piece and aligns with bore 38 of cap 32.

Both cap 32 and flange 40 are welded to body 28 by spot welds as indicated at 46.

A bolt 48 which is preferably ¼" by 4⅛" of stainless steel is provided. Bolt 48 includes a head 49 and a threaded end 40 onto which nut 52 is threaded.

Bolt 48 is passed through cross piece opening 44 and through cap bore 38 until head 49 engages cross piece 42. Nut 52 is threaded onto the threaded end of the bolt and into engagement with cap 32, where it is tightened securely, holding cap 32 and flange 40 in engagement with body 28.

Filter 26 is placed with flange 40 in engagement with the end of outlet opening 16. The threaded end of coupling sleeve 18 passes over the flange and engages with the threaded portion of outlet 16. A shoulder inwardly of the sleeve opening engages with flange 40 as sleeve 18 is tightened onto outlet 16 locking the filter or strainer in fixed position. The first end of the filter is fitted into outlet pipe 23 forward of the valve 20. Sleeve 18 also engages with outlet pipe 23 securing discharge unit 16 with the distribution line.

It is noted that hydrant 14, outlet 16, sleeve 18 and pipe 23 are all standard equipment which form parts of the distribution lines. Filter 26 is constructed to function within this standard equipment.

The filter or strainer 26 acts to engage and retain any debris in the water prior to the water passing through the discharge units.

Figure 4A:
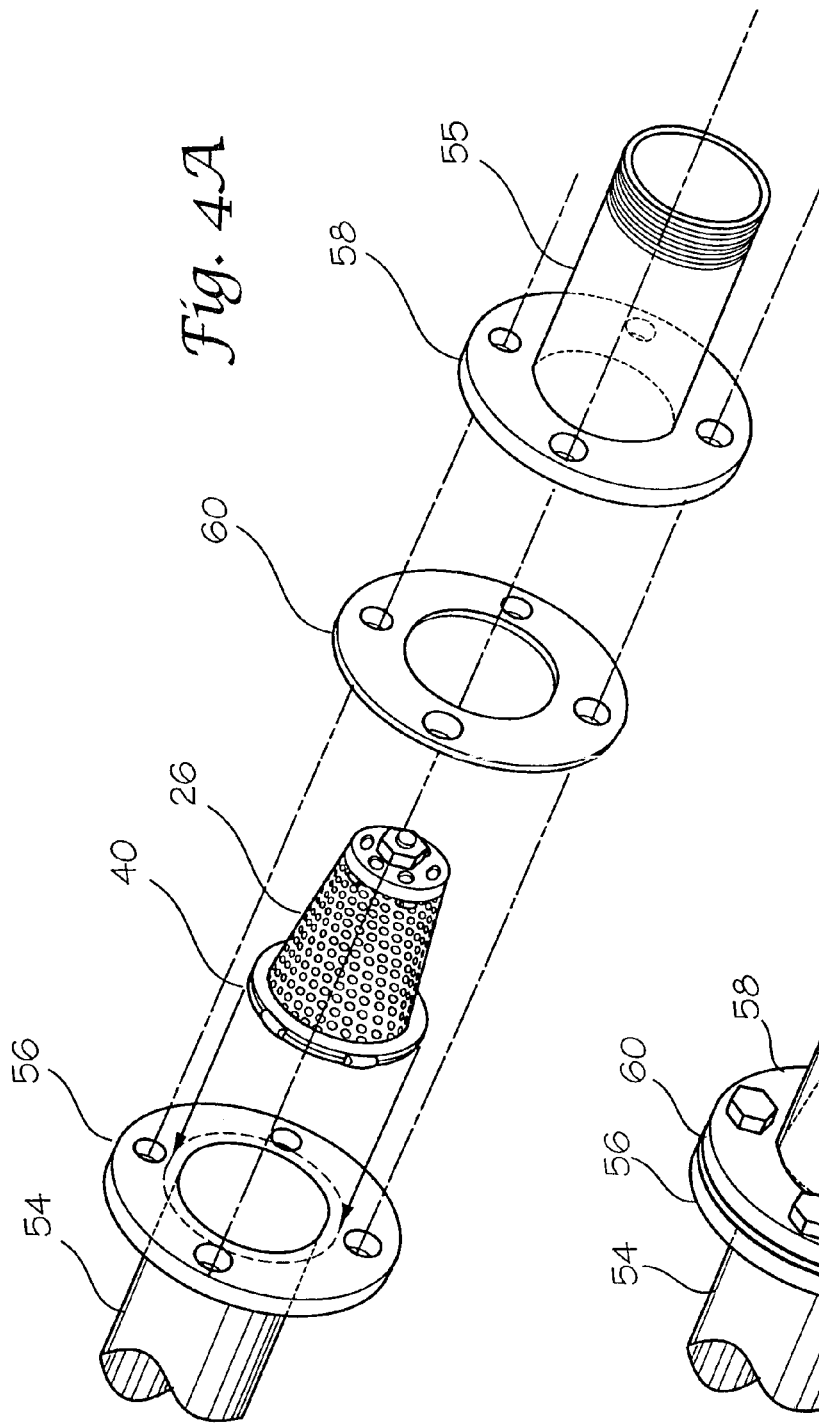
FIG. 4A is an exploded perspective view of means connecting the filter/strainer with a pipe.
Figure 4B:
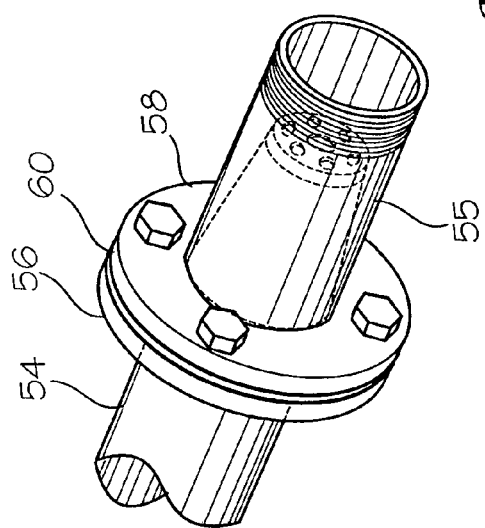
FIG. 4B is similar to FIG. 4A showing the filter/strainer engaged in fixed position in a pipe.

The arrangement shown in FIG. 2B is designed for use in cold climates where freezing is a problem. In this arrangement, the distribution lines include an outlet pipe 54 from main line 12 which has flange 56 at its end. Extension 55 also includes a flange 58. Filter 26 is positioned with its body 28 inside extension 55 with flange 40 engaged between flange 58 of extension 55 and flange 56 of pipe 54. Flanges 56 and 58, along with flange 40 and filter 60 are bolted into engagement as shown in FIG. 4B. Washer 60 is optional and acts only to further assist with proper sealing of the connection. Further downstream, valve 20 and valve control or programmed pod 22 are connected with pipe 55 and outlet pipe 24', which connects with a discharge end as shown. Discharge removal pipe 62 is provided to receive the discharged water and deliver it to a proper destination.

In this arrangement, filter 26 operates as above described to retain and prevent debris from clogging open filter 20.

Again, flanges 55 and 56, along with filter 60, are standard equipment. Also, the valve 20 and valve control 22 are also standard equipment.

While a preferred embodiment of the invention has been described using specific terms, such description is for illustrative purposes only, and it is to be understood that changes and variations may be made without departing from the spirit or scope of the following claims.

What is claimed is:

1. A filter for use with an automatic flushing arrangement of a water system, said water system including a main pipe line with a plurality of distribution lines connected therewith, said distribution lines including a plurality of inter-connected water distribution members, said automatic flushing arrangement being engaged with selected of said water distribution members and comprising a valve movable between open and closed positions and a programmed pod for moving said valve between said open and closed positions at predetermined intervals, said filter being conically shaped and including:

a perforated body having a first end and a larger second end, said first end being covered with a perforated cap secured with said body and said second end having an outwardly directed flange secured therewith, said flange including a cross piece which extends across said open second end, an elongate member interconnecting with said cross piece and said cap, said elongate member further securing said cap with said filter;

said conical strainer being positioned in a hollow interior of a water distribution member with said flange of said filter being located between adjacent ends of adjacent distribution members fixedly positioning said strainer upstream of said valve; whereby, when said valve is opened by said programmed pod to flush said water system of sediment and chemical buildup, debris in said water system moving through said filter toward said valve and an exit end is caught and retained by said filter preventing said debris from disabling the operation of said valve.

2. The system of claim 1 wherein said perforated cap has a downwardly directed collar, said cap being positioned over said first end with said collar engaged over an edge portion of said body.

3. The system of claim 1 wherein said adjacent ends of said distribution members are flanged, said filter flange being engaged between said flange ends of said distribution members.

4. The system of claim 3 wherein a washer is positioned between said flanged ends and said filter flange.

5. The system of claim 1 wherein said body is made of perforated stainless steel.

6. The system of claim 1 wherein said distribution member ends are interconnected with threaded coupling sleeves, said flange of said filter being engaged between interconnected ends of said distribution members.

7. The system of claim 1 wherein said elongate member comprises a bolt and nut which allows adjustable pressure between said cross piece and said cap.

8. The system of claim 1 wherein said filter flange and said cap are secured with said body by welding.

9. The system of claim 1 wherein said filter has about 33% open space.

10. The system of claim 1 wherein at least one of said body, said cap and said filter flange is formed of 24 gauge stainless steel.

11. A filter for use with a flushing arrangement for a water system comprising:
- a conically shaped body having a first end and a larger second end, said body consisting of perforated 24 gauge stainless steel providing about 33% open space;
- a perforated cap having a down turned collar secured with said first end;
- an outwardly directed flange including a cross piece secured with said second end; and
- an elongated member extending between said cap and said cross piece further securing said cap and said flange with said body.

* * * * *